US008476888B1

(12) United States Patent
Chen et al.

(10) Patent No.: US 8,476,888 B1
(45) Date of Patent: Jul. 2, 2013

(54) SWITCHING REGULATOR PROVIDING CURRENT REGULATION BASED ON USING SWITCHING TRANSISTOR CURRENT TO CONTROL ON TIME

(75) Inventors: Hai Chen, Tucson, AZ (US); Pak-Kong Dunn, Kwun Tong (HK)

(73) Assignee: National Semiconductor Corporation, Santa Clara, CA (US)

( * ) Notice: Subject to any disclaimer, the term of this patent is extended or adjusted under 35 U.S.C. 154(b) by 562 days.

(21) Appl. No.: 12/660,316

(22) Filed: Feb. 24, 2010

(51) Int. Cl.
*G05F 1/575* (2006.01)
(52) U.S. Cl.
USPC .......................................... 323/284
(58) Field of Classification Search
USPC .......................................... 323/284
See application file for complete search history.

(56) References Cited

U.S. PATENT DOCUMENTS

| 7,388,359 | B1 | 6/2008 | Ling |  |
|---|---|---|---|---|
| 7,508,181 | B2 * | 3/2009 | Chen et al. | 323/282 |
| 7,834,608 | B2 * | 11/2010 | Cheng et al. | 323/299 |
| 2008/0278138 | A1 | 11/2008 | Wei |  |

FOREIGN PATENT DOCUMENTS

WO    WO 2007061369 A1 *    5/2007

OTHER PUBLICATIONS

"Step-Down 1A LED Driver", Linear Technology, 2005, 20 pages.
"LM3405, 1.6MHz, 1A Constant Current Buck Regulator for Powering LEDs", National Semiconductor Corporation, Feb. 2007, 20 pages.
Oh, In-Hwan "An Analysis of Current Accuracies in Peak and Hysteretic Current Controlled Power LED Drivers", IEEE, 2008, p. 572-577.

* cited by examiner

*Primary Examiner* — Harry Behm
(74) *Attorney, Agent, or Firm* — Andrew S. Viger; Wade J. Brady, III; Frederick J. Telecky, Jr.

(57) ABSTRACT

An apparatus includes a sense element that generates a sense signal based on an output signal generated by a regulator. The apparatus also includes a current control unit that generates a compensated reference signal using the sense signal. The compensated reference signal is associated with an average of the output signal. The apparatus further includes a comparator that compares the compensated reference signal and the sense signal. In addition, the apparatus includes a hysteretic control unit that adjusts a control signal based on an output of the comparator and that provides the control signal to the regulator in order to adjust the output signal generated by the regulator. The hysteretic control unit could dynamically adjust peak and valley currents through an inductor in the regulator to maintain the average of the output signal at a substantially constant value.

20 Claims, 6 Drawing Sheets

SWITCHING REGULATOR PROVIDING CURRENT REGULATION BASED ON USING SWITCHING TRANSISTOR CURRENT TO CONTROL ON TIME

TECHNICAL FIELD

This disclosure relates generally to power supply systems. More specifically, this disclosure relates to balanced hysteretic control of a regulator for fast response, high efficiency, precise constant output.

BACKGROUND

Many systems use light emitting diodes (LEDs) to generate light. Often times, multiple LEDs are coupled together to form a string of LEDs, and a switched mode regulator generates a supply voltage for the LED string. To control the amount of current flowing through the LED string, a resistive sense element is typically coupled in series with the LED string. The current flows through the resistive sense element, generating a voltage that can be compared to a reference voltage. The regulator can use the result of the comparison to adjust the voltage supplied to the LED string. The regulator often uses a pulse width modulation (PWM) control technique to adjust the voltage supplied to the LED string.

This type of system can suffer from various shortcomings. For example, fixed-frequency PWM control techniques often require loop compensation to achieve a stable control loop. However, this typically limits the system response and increases circuit complexity. Also, a resistive sense element coupled in series with the LED string dissipates power during the LED string's entire operating period. This reduces system efficiency and can result in major power losses when driving high-power LEDs.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
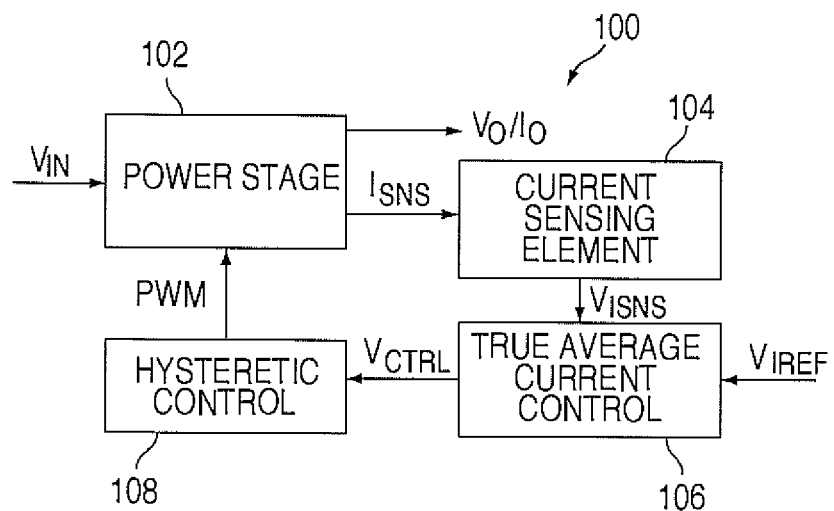
FIG. 1 illustrates an example circuit for balanced hysteretic control of a regulator according to this disclosure.

FIG. 1 illustrates an example circuit 100 for balanced hysteretic control of a regulator according to this disclosure. As shown in FIG. 1, the circuit 100 includes a power stage 102. The power stage 102 generally denotes circuitry forming a switching mode regulator, which could represent a current regulator or a voltage regulator. The power stage 102 operates to receive an input voltage $V_{IN}$ and generate a regulated output voltage $V_O$ or regulated output current $I_O$. The power stage 102 includes any suitable structure for generating a regulated voltage or current. For example, the power stage 102 could include circuitry that forms a buck converter regulator. The power stage 102 typically includes one or more switches and one or more inductors.

The circuit 100 also includes a current sensing element 104, a true average current control unit 106, and a hysteretic control unit 108. These components 104-108 operate to implement a balanced hysteretic control (BHC) technique that allows both fast response and low-loss sensing for true average current control and low power loss. The current sensing element 104 receives a current and generates a corresponding sense voltage. The current through the current sensing element 104 is denoted $I_{SNS}$, and the sense voltage is denoted $V_{IsNS}$. The current sensing element 104 includes any suitable component for sensing current, such as a resistor. The current sensing element 104 can be coupled to a switch in the power stage 102 (rather than to a load, such as a string of light emitting diodes). In this way, the current sensing element 104 may receive current during switch conduction but not at other times, which can help to reduce power losses.

Figure 5:
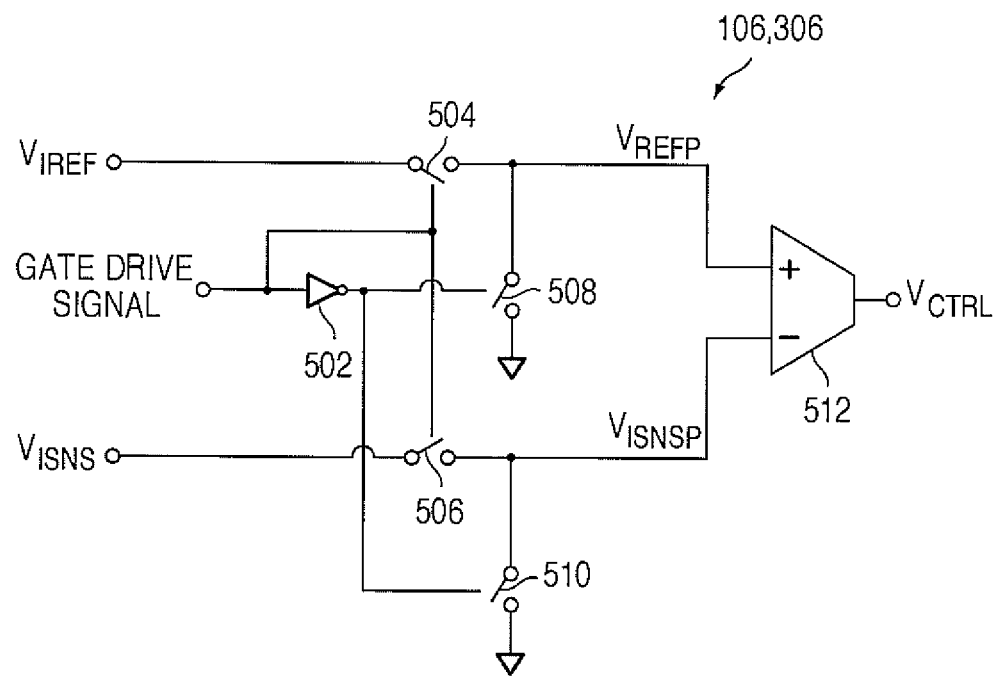
FIG. 5 illustrates an example true average current control unit in the circuits of FIGS. 1 and 3 according to this disclosure.

The true average current control unit 106 processes the sense voltage $V_{ISNS}$ and a well-defined reference voltage $V_{IREF}$ to identify an average output current of the power stage 102. The average output current can be identified in a known and specified sampling base, and the true average current control unit 106 generates a compensated reference voltage $V_{CTRL}$ used for hysteretic control. The true average current control unit 106 includes any suitable structure for identifying an average current and generating a compensated reference voltage. An example embodiment of the true average current control unit 106 is shown in FIG. 5, which is described below.

Figure 7:
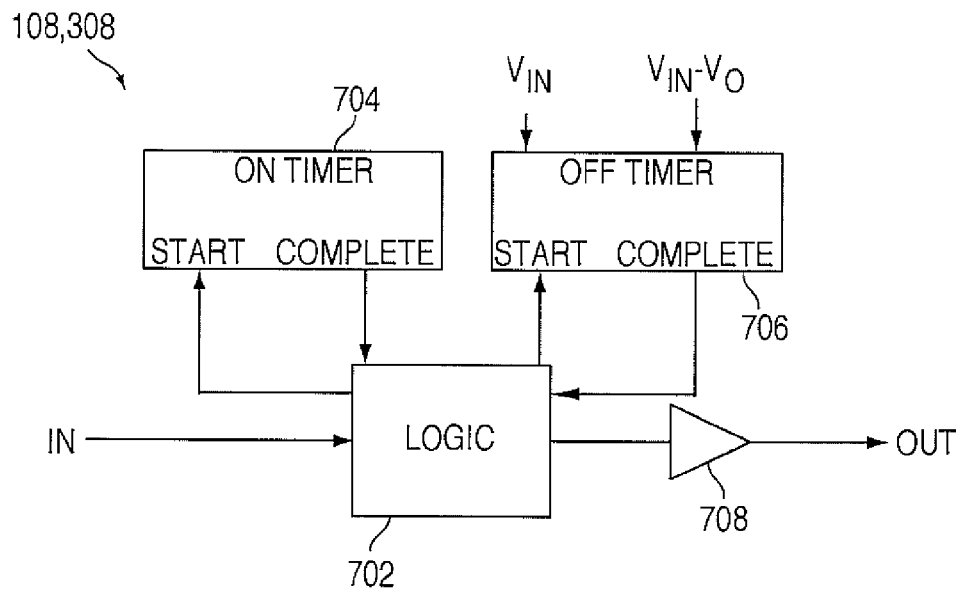
FIG. 7 illustrates an example hysteretic control unit in the circuits of FIGS. 1 and 3 according to this disclosure.

The hysteretic control unit 108 uses the compensated reference voltage $V_{CTRL}$ to dynamically control the peak or valley current through an inductor in the power stage 102. This is done by adjusting a pulse width modulation (PWM) signal provided to the power stage 102, where the PWM signal is used as a gate drive signal to drive one or more switches in the power stage 102. As a result, when the input voltage $V_{IN}$ or the inductance L of the inductor in the power stage 102 varies, the peak or valley current through the inductor can be adjusted accordingly until the average output current (or inductor charge) is balanced. This can be done with a fast frequency response. The hysteretic control unit 108 includes any suitable structure for dynamically controlling a peak or valley current through an inductor. An example embodiment of the hysteretic control unit 108 is shown in FIG. 7, which is described below.

Figure 2:
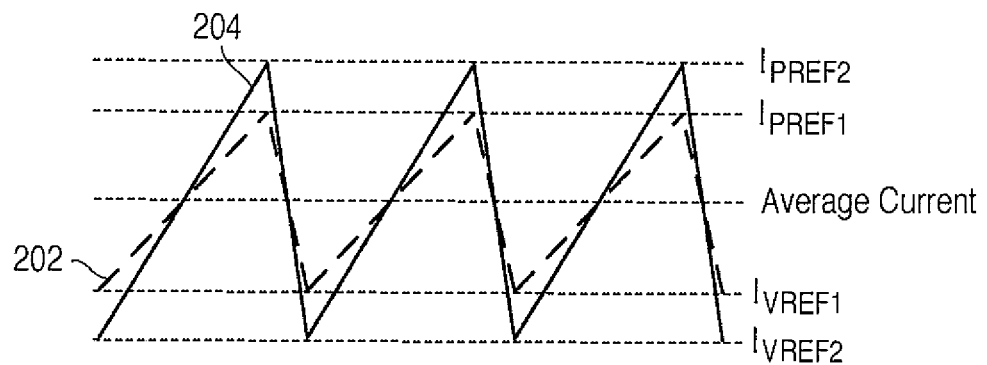
FIG. 2 illustrates example waveforms in the circuit of FIG. 1 according to this disclosure.

FIG. 2 illustrates example waveforms in the circuit 100 of FIG. 1 according to this disclosure. In particular, FIG. 2 illustrates an example of the dynamic control of peak and valley currents through an inductor in the power stage 102 by the hysteretic control unit 108. In FIG. 2, a line 202 denotes a first current flowing through an inductor in the power stage 102. In this example, the first current has a generally smaller (shorter) peak $I_{PREF1}$ and a shallower valley $I_{VREF1}$.

Due to some change in the circuit 100, the hysteretic control unit 108 can dynamically change the peak and valley currents through the inductor in the power stage 102. In FIG. 2, a line 204 denotes a second current flowing through the inductor in the power stage 102. In this example, the second current has a generally larger (taller) peak $I_{PREF2}$ and a deeper valley $I_{VREF2}$.

By dynamically adjusting the peak and valley currents through the inductor in the power stage 102, the hysteretic control unit 108 can adjust operation of the circuit 100 based on changing circumstances. However, in either case shown in FIG. 2, the average current through the inductor remains generally constant. As a result, the hysteretic control unit 108 can help to achieve true average current control by dynamically adjusting the peak and valley currents through the inductor in the power stage 102.

Figure 3:
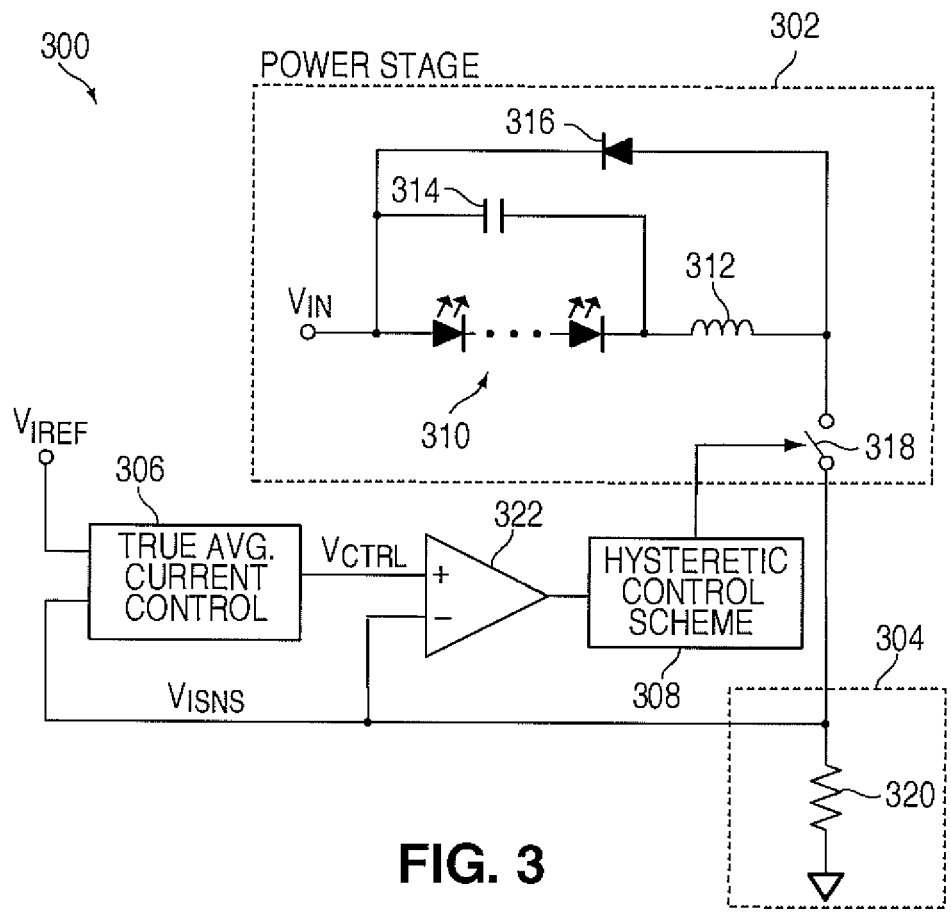
FIG. 3 illustrates an example circuit for balanced hysteretic control of a regulator used with a string of light emitting diodes (LEDs) according to this disclosure.

FIG. 3 illustrates an example circuit 300 for balanced hysteretic control of a regulator used with a string of light emitting diodes (LEDs) according to this disclosure. As shown in FIG. 3, the circuit 300 includes a power stage 302, a current sensing element 304, a true average current control unit 306, and a hysteretic control unit 308. In this example, the power stage 302 includes or otherwise operates in conjunction with an LED string 310. The LED string 310 here includes multiple LEDs coupled in series, although any number and arrangement (series and/or parallel connections) could be used in the LED string 310.

The LED string 310 is coupled to receive an input voltage $V_{IN}$. The LED string 310 is also coupled to an inductor 312. The inductor 312 represents any suitable inductive structure having any suitable inductance. A capacitor 314 is coupled across the LED string 310. The capacitor 314 includes any suitable capacitive structure having any suitable capacitance. A diode 316 is coupled across the components 310-314. The diode 316 includes any suitable structure for substantially limiting current flow in one direction.

The inductor 312 and the diode 316 are coupled to a switch 318, which is also coupled to the current sensing element 304. In accordance with conventional operation of a buck switching regulator, the switch 318 is switched on (become conductive) in order to couple current through the LED string 310, inductor 312 and switch 318, to the current sensing element 304. The switch 318 is switched off (become substantially nonconductive) in order to break this current path, so that current through the LED string 310 flows through inductor 312 and diode 316, now forward biased by the inductor 312. The switch 318 includes any suitable switching device, such as a power transistor.

In this example, the current sensing element 304 represents a resistor 320. The resistor 320 includes any suitable resistive structure having any suitable resistance. As shown in FIG. 3, the current sensing element 304 is coupled to the switch 318, rather than to the LED string 310. As a result, the current sensing element 304 senses the current flowing through the inductor 312 when the switch 318 is closed.

A sense voltage $V_{ISNS}$ across the resistor 320 is provided to the true average current control unit 306 and a comparator 322. The true average current control unit 306 uses the sense voltage $V_{ISNS}$ and a well-defined reference voltage $V_{IREF}$ to generate a compensated reference voltage $V_{CTRL}$. An example embodiment of the true average current control unit 306 is shown in FIG. 5, which is described below. The comparator 322 compares the sense voltage $V_{ISNS}$ and the compensated reference voltage $V_{CTRL}$. The comparator 322 includes any suitable structure for comparing inputs.

The hysteretic control unit 308 receives outputs generated by the comparator 322. These outputs indicate whether the sense voltage $V_{ISNS}$ exceeds the compensated reference voltage $V_{CTRL}$. The hysteretic control unit 308 generates a PWM signal, which acts as a gate drive signal for controlling the switch 318. The hysteretic control unit 308 can adjust the PWM signal to modify the peak and valley currents flowing through the inductor 312 as described above. An example embodiment of the hysteretic control unit 308 is shown in FIG. 7, which is described below.

Figure 4:
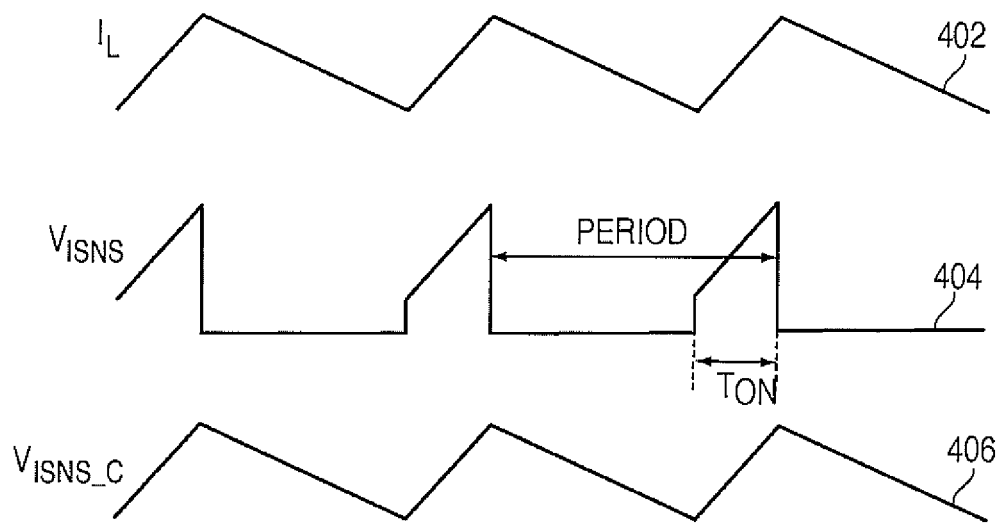
FIG. 4 illustrates example waveforms in the circuit of FIG. 3 according to this disclosure.

FIG. 4 illustrates example waveforms in the circuit 300 of FIG. 3 according to this disclosure. As shown in FIG. 4, a line 402 denotes the inductor current $I_L$ through the inductor 312. The inductor current $I_L$ generally see-saws back and forth between peak and valley limits, which are controlled by the hysteretic control unit 308. A line 404 denotes the sense voltage $V_{ISNS}$ generated by the current sensing element 304. As shown here, the sense voltage $V_{ISNS}$ increases when the inductor current $I_L$ increases. However, the sense voltage $V_{ISNS}$ becomes zero or substantially zero during times when the inductor current $I_L$ decreases because the switch 318 has been opened, which blocks the inductor current $I_L$ from the current sensing element 304. This differs from conventional systems that might operate as shown by a line 406, which represents a conventional sense voltage $V_{ISNS\_C}$ that constantly follows the inductor current $I_L$.

As shown in FIG. 4, the current sensing resistor 320 may be connected to the inductor 312 (and therefore generating a loss) only during the on cycle of the switch 318. In FIG. 4, the length of time for a single on cycle is denoted $T_{ON}$, and the length of time between on cycles represents one period. Because of this arrangement, power losses during the off cycle of the current sense element 304 can be eliminated. This improves system efficiency, especially when the input/output down ratio is high and when high-power LEDs are driven.

FIG. 5 illustrates an example true average current control unit 106, 306 in the circuits 100, 300 of FIGS. 1 and 3 according to this disclosure. As shown in FIG. 5, the true average current control unit 106, 306 receives the sense voltage $V_{ISNS}$ and the reference voltage $V_{IREF}$. The true average current control unit 106, 306 also receives a gate drive signal, which is generated by the hysteretic control unit. The gate drive signal can be used, for example, to turn the switch 318 on and off. The gate drive signal is inverted by an inverter 502.

The gate drive signal is used to control two switches 504-506, and the inverted gate drive signal is used to control two other switches 508-510. The switch 504 can pass the reference voltage $V_{IREF}$ to a non-inverting input of an error amplifier 512 or block the reference voltage $V_{IREF}$. The switch 506 can pass the sense voltage $V_{ISNS}$ to an inverting input of the error amplifier 512 or block the sense voltage $V_{ISNS}$. The switch 508 can couple the non-inverting input of the error amplifier 512 to ground, and the switch 510 can couple the inverting input of the error amplifier 512 to ground. The switches 504-510 therefore control which voltages are provided to the inputs of the error amplifier 512. The error amplifier 512 generates the compensated reference voltage $V_{CTRL}$ by amplifying the direct current (DC) error between its two input voltages.

The inverter 502 includes any suitable structure for inverting a signal. Each switch 504-510 includes any suitable switching device, such as a transistor. The error amplifier 512 includes any suitable structure for amplifying a difference between input signals.

The true average current control unit 106, 306 here operates based on a pulse-level modulation (PLM) technique. In this technique, the integral of the switch current (represented by $V_{ISNS}$) is compared with the integral of the reference voltage ($V_{IREF}$) during the on cycle of the switch 318. This generates an error signal that is transformed into the compensated reference voltage ($V_{CTRL}$), which can be used to define the peak inductor current through an inductor (such as the inductor 312). Additional details regarding this type of true average current control unit 106, 306 are provided in U.S. Pat. No. 7,388,359, which is hereby incorporated by reference.

Figure 6:
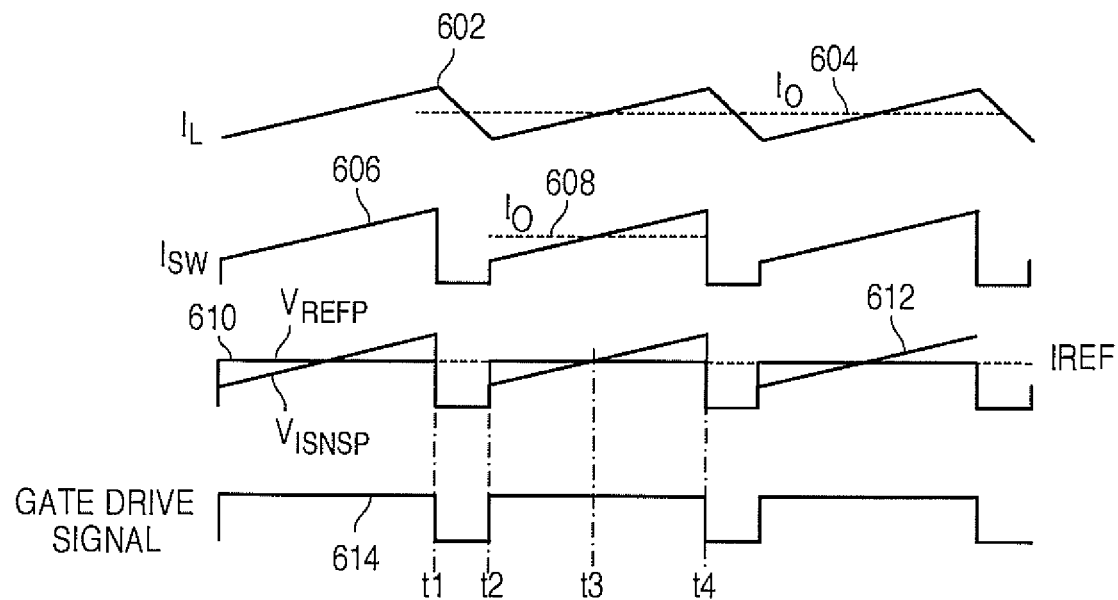
FIG. 6 illustrates example waveforms in the true average current control unit of FIG. 5 according to this disclosure.

FIG. 6 illustrates example waveforms in the true average current control unit 500 of FIG. 5 according to this disclosure. As shown in FIG. 6, a line 602 denotes the inductor current $I_L$ through, for example, the inductor 312. The inductor current $I_L$ rises and falls repeatedly. This leads to a generally constant average output current $I_O$, which is denoted by a line 604. A line 606 denotes the current $I_{SW}$ through, for example, the switch 318. The switch current $I_{SW}$ generally tracks the inductor current $I_L$ when the switch is closed and is generally zero when the switch is opened. Once again, the switch current $I_{SW}$ leads to a generally constant output current $I_O$, which is also denoted by a line 608. As long as the power stage 102, 302 operates in continuous conduction mode, the average of the inductor current $I_L$ during the on cycle of the switch (or the average of the switch current $I_{SW}$ during the on cycle of the switch) is equal to the average output current $I_O$.

A line 610 denotes a reference pulse signal $V_{REFP}$, which is the signal generated by the switches 504 and 508 that is provided to the non-inverting input of the amplifier 512. The reference pulse signal $V_{REFP}$ is synchronized with a current sense pulse signal $V_{ISNSP}$ denoted by a line 612. The sense pulse signal $V_{ISNSP}$ is the signal generated by the switches 506 and 510 that is provided to the inverting input of the amplifier 512. This allows comparison only during the on cycle of the switch 318.

A line 614 denotes the gate drive signal. As shown here, when the gate drive signal 614 goes low at time $t_1$, it turns off the switch 318, causing the switch current $I_{SW}$ to drop. This causes the sense pulse signal $V_{ISNSP}$ and the reference pulse signal $V_{REFP}$ to drop. The gate drive signal 614 goes high at time $t_2$, turning on the switch 318. This causes the switch current $I_{SW}$ and the sense pulse signal $V_{ISNSP}$ to begin increasing, and it causes the reference pulse signal $V_{REFP}$ to go high. The sense pulse signal $V_{ISNSP}$ exceeds the reference pulse signal $V_{REFP}$ at time $t_3$, which identifies the time when the switch current $I_{SW}$ equals the average output current $I_O$. The gate drive signal 614 goes low again at time $t_4$ to repeat another cycle.

FIG. 7 illustrates an example hysteretic control unit 108, 308 in the circuits 100, 300 of FIGS. 1 and 3 according to this disclosure. As shown in FIG. 7, the hysteretic control unit 108, 308 includes a logic unit 702, which receives an input signal IN. The input signal IN could, for example, be provided by the comparator 322. The logic unit 702 also sends signals to and receives signals from an on timer 704 and an off timer 706. The logic unit 702 uses the input signal IN from the comparator 322 and signals from the timers 704-706 to turn the switch 318 on or off. The logic unit 702 generates an output that is provided to a driver 708, which generates an output signal OUT. The output signal OUT could represent the gate drive signal discussed above.

The logic unit 702 includes any suitable structure for generating a signal to control at least one switch. Each timer 704-706 includes any suitable structure for defining a specified amount of time. Each timer 704-706 could, for instance, represent a one-shot timer. The driver 708 includes any suitable structure for driving a signal.

In some embodiments, the hysteretic control unit 108, 308 can utilize a constant off-time (CFT) scheme, which is based on the output of the comparator 322 and the off-timer 706. The comparator 322 compares the sense voltage $V_{ISNS}$ and the compensated reference voltage $V_{CTRL}$. If the sense voltage $V_{ISNS}$ is above the compensated reference voltage $V_{CTRL}$, the switch 318 can be turned off for a fixed time period defined by the off timer 706. Following this off-time, the switch 318 is turned on for a fixed time determined by the on timer 704 or until the sense voltage $V_{ISNS}$ rises above the compensated reference voltage $V_{CTRL}$, whichever is longer. The switch 318 is then turned off for another off-time period during the next cycle.

Figure 8:
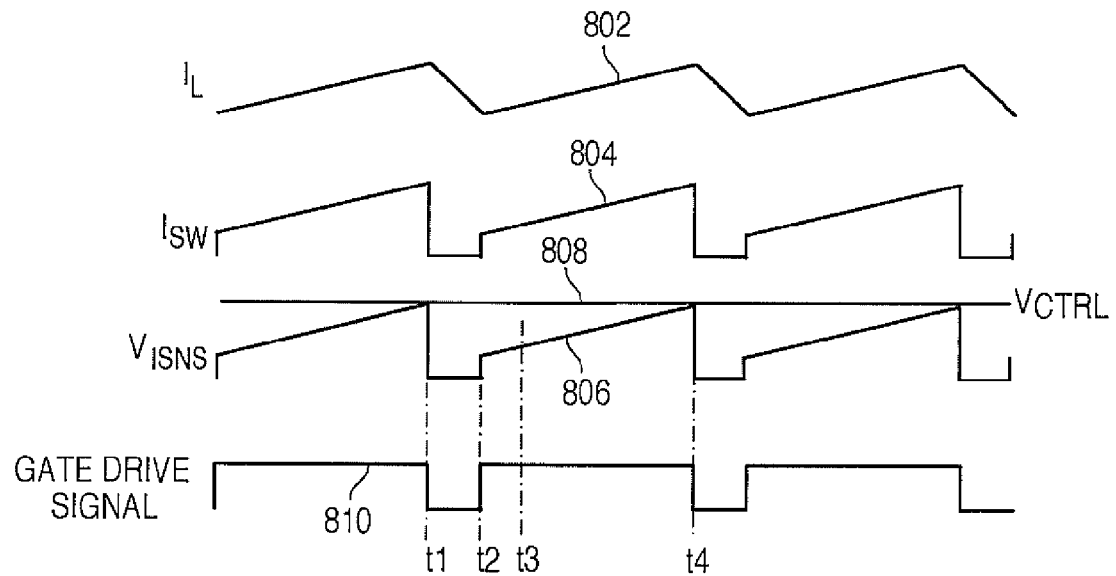
FIG. 8 illustrates example waveforms in the hysteretic control unit of FIG. 7 according to this disclosure.

FIG. 8 illustrates example waveforms in the hysteretic control unit 108, 308 of FIG. 7 according to this disclosure. As shown in FIG. 8, a line 802 denotes the inductor current $I_L$, and a line 804 denotes the switch current $I_{SW}$. A line 806 denotes the sense voltage $V_{ISNS}$, a line 808 denotes the compensated reference voltage $V_{CTRL}$, and a line 810 denotes the gate drive signal.

In FIG. 8, the sense voltage $V_{ISNS}$ reaches the compensated reference voltage $V_{CTRL}$ at time $t_1$, triggering the off timer 706. This causes the hysteretic control unit 108, 308 to drive the gate drive signal low. From time $t_1$ to time $t_2$, the switch 318 is turned off for the fixed time defined by the off timer 706. At time $t_2$, the off timer 706 finishes timing, and the on timer 704 is triggered. This causes the hysteretic control unit 108, 308 to drive the gate drive signal high, causing an increase in the inductor current $I_L$, the switch current $I_{SW}$, and the sense voltage $V_{ISNS}$. From time $t_2$ to time $t_3$, the switch 318 remains turned on for at least a minimum amount of time as defined by the on timer 704. Between time $t_3$ and time $t_4$, the on timer 704 finishes timing, but the switch 318 remains turned on because the sense voltage $V_{ISNS}$ is lower than the compensated reference voltage $V_{CTRL}$. At time $t_4$, the sense voltage $V_{ISNS}$ reaches the compensated reference voltage $V_{CTRL}$, triggering the off timer 706 again to start another switching cycle.

Figure 9:
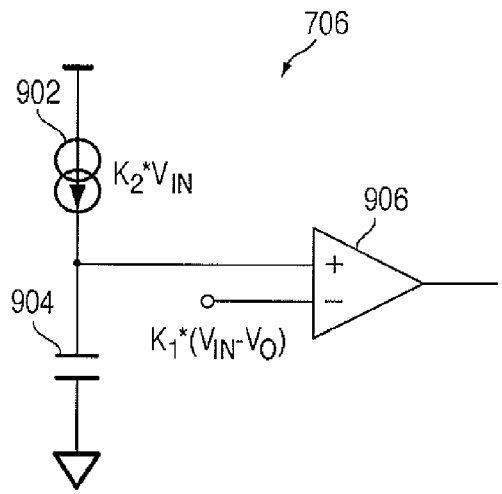
FIG. 9 illustrates an example off timer in the hysteretic control unit of FIG. 7 according to this disclosure.

FIG. 9 illustrates an example off timer 706 in the hysteretic control unit 108, 308 of FIG. 7 according to this disclosure. As shown in FIG. 9, the off timer 706 includes a current source 902, a capacitor 904, and a comparator 906. The current source 902 includes any suitable structure for providing a controllable current. The capacitor 904 includes any suitable capacitive structure having any suitable capacitance. The comparator 906 includes any suitable structure for comparing inputs.

In this example, the values $V_{IN}$ and $(V_{IN}-V_O)$ are sensed to control the off time $T_{OFF}$ of the gate drive signal. In this example, the current source 902 provides a current that equals $K_2 \times V_{IN}$, where $K_2$ is a constant. Also, the comparator 906 receives (i) a voltage based on the charge stored on the capacitor 904 at its non-inverting input and (ii) a voltage defined as $K_1 \times (V_{IN}-V_O)$ on its inverting input, where $K_1$ is another constant. Based on this, the off time $T_{OFF}$ enforced by the off timer 706 can be expressed as:

$$T_{OFF} = K_1 \times (V_{IN}-V_O) \times C_{OFF}/(K_2 \times V_{IN}) \quad (1)$$

where $C_{OFF}$ denotes the capacitance of the capacitor 904. The length of a switching cycle $T_S$ (the period shown in FIG. 4) can be expressed as:

$$T_S = T_{OFF} \times V_{IN}/(V_{IN}-V_O) = K_1 \times C_{OFF}/K_2. \quad (2)$$

In addition, the switching frequency $F_S$ can be expressed as:

$$F_S = K_2/(K_1 \times C_{OFF}). \quad (3)$$

As can be seen here, the switching frequency remains substantially constant despite variations in the input and output voltages $V_{IN}$ and $V_O$.

Figure 10:
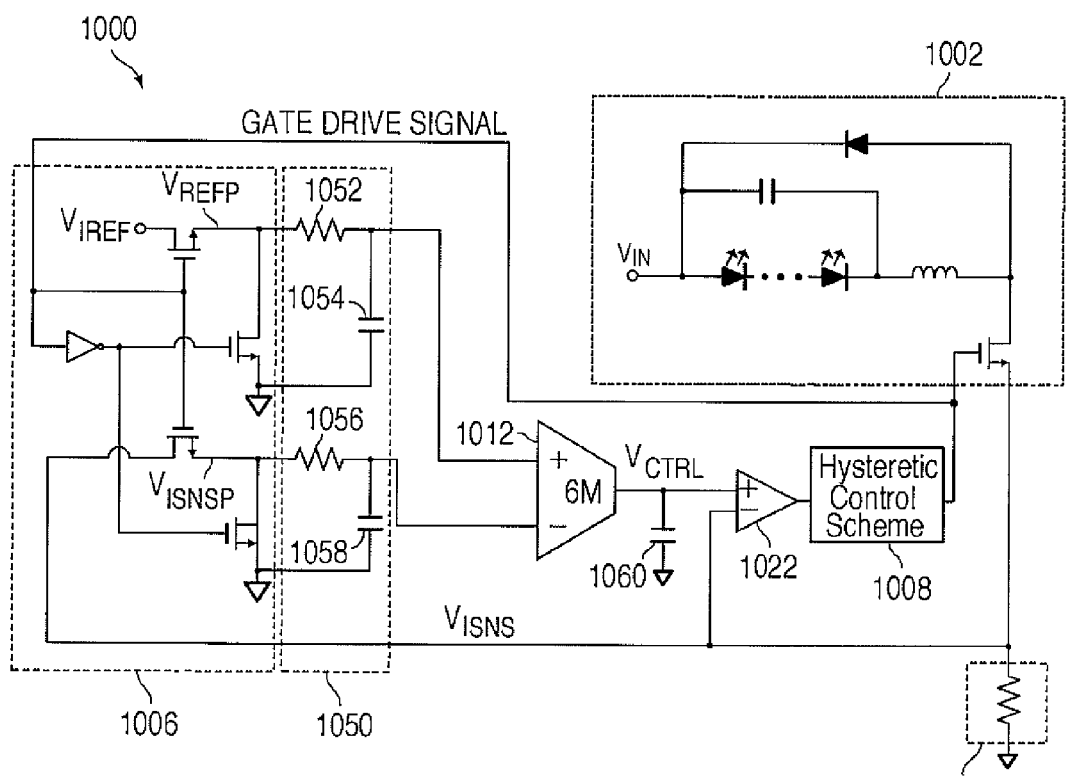
FIG. 10 illustrates an example circuit for balanced hysteretic control of a floating buck regulator according to this disclosure.

FIG. 10 illustrates an example circuit 1000 for balanced hysteretic control of a floating buck regulator according to this disclosure. In this example, the circuit 1000 includes a power stage 1002, which is similar in structure to the power stage 302 described above. The power stage 1002 here denotes a floating constant current buck regulator, which receives peak current control signals in the form of a gate drive signal for its switch. Note, however, that other regulators could be used, such as a high-side buck current regulator.

The circuit 1000 also includes a current sensing element 1004 having a resistor. The circuit 1000 further includes a true average current control unit 1006 and an error amplifier 1012, which are similar in arrangement to the true average current control unit 106, 306 shown in FIG. 5. However, in this example, the reference pulse signal $V_{REFP}$ and the sense pulse signal $V_{ISNSP}$ are provided to a RC system 1050. The RC system 1050 includes a first RC circuit having a resistor 1052 that receives the reference pulse signal $V_{REFP}$ and a capacitor 1054 coupled to the resistor 1052. The RC system 1050 also includes a second RC circuit having a resistor 1056 that receives the sense pulse signal $V_{ISNSP}$ and a capacitor 1058 coupled to the resistor 1056. The resistor 1052 and capacitor 1054 generally filter the reference pulse signal $V_{REFP}$ to generate a reference sawtooth signal, and the resistor 1056 and capacitor 1058 generally filter the sense pulse signal $V_{ISNSP}$ to generate a sense sawtooth signal. The sawtooth signals are then compared by the error amplifier 1012. Each resistor 1052, 1056 includes any suitable resistive structure having any suitable resistance. Each capacitor 1054, 1058 includes any suitable capacitive structure having any suitable capacitance.

The error amplifier 1012 generates a compensated reference voltage $V_{CTRL}$ based on its inputs. The compensated reference voltage $V_{CTRL}$ is stored on a capacitor 1060, which includes any suitable capacitive structure having any suitable capacitance. The compensated reference voltage $V_{CTRL}$ is provided to a comparator 1022, which generates a signal that is provided to the hysteretic control unit 1008. The hysteretic control unit 1008 could have the same structure as that shown in FIG. 7.

In this circuit 1000, the gate drive signal generated by the hysteretic control unit 1008 is fed back and used to modulate the reference voltage $V_{IREF}$ to form a well-controlled square wave ($V_{REFP}$), which is synchronized with the sense pulse voltage $V_{ISNSP}$. The closed-loop operation of the circuit 1000 and the high gain of the error amplifier 1012 work together and regulate the sense voltage $V_{ISNS}$ so that its DC level (and thus the DC level of the output current $I_O$) is regulated with respect to the reference voltage $V_{IREF}$. As system variables are confined in a negative feedback loop, the two RC circuits in the RC system 1050 can be matched to produce precise synchronization and matched parasitic effects. As a result, system accuracy can be guaranteed through the use of a precise well-controlled DC reference ($V_{IREF}$, which can be trimmed) and the high gain of the error amplifier 1012. Also, since constant off-time hysteretic control can be used, higher bandwidth can be achieved, resulting in a fast response. This allows the circuit 1000 to implement a regulator with a fast response, high efficiency, and accurate constant current control.

Although FIGS. 1 through 10 illustrate various example circuits for balanced hysteretic control of a regulator and related waveforms, various changes may be made to FIGS. 1 through 10. For example, the circuits in these figures could include any additional components according to particular needs. Also, while various circuit elements have been described as being used to perform particular functions, those functions could be performed by any other suitable circuit elements. In addition, the waveforms shown in these figures represent examples of the types of signals that could be present in various circuits described above.

Figure 11:
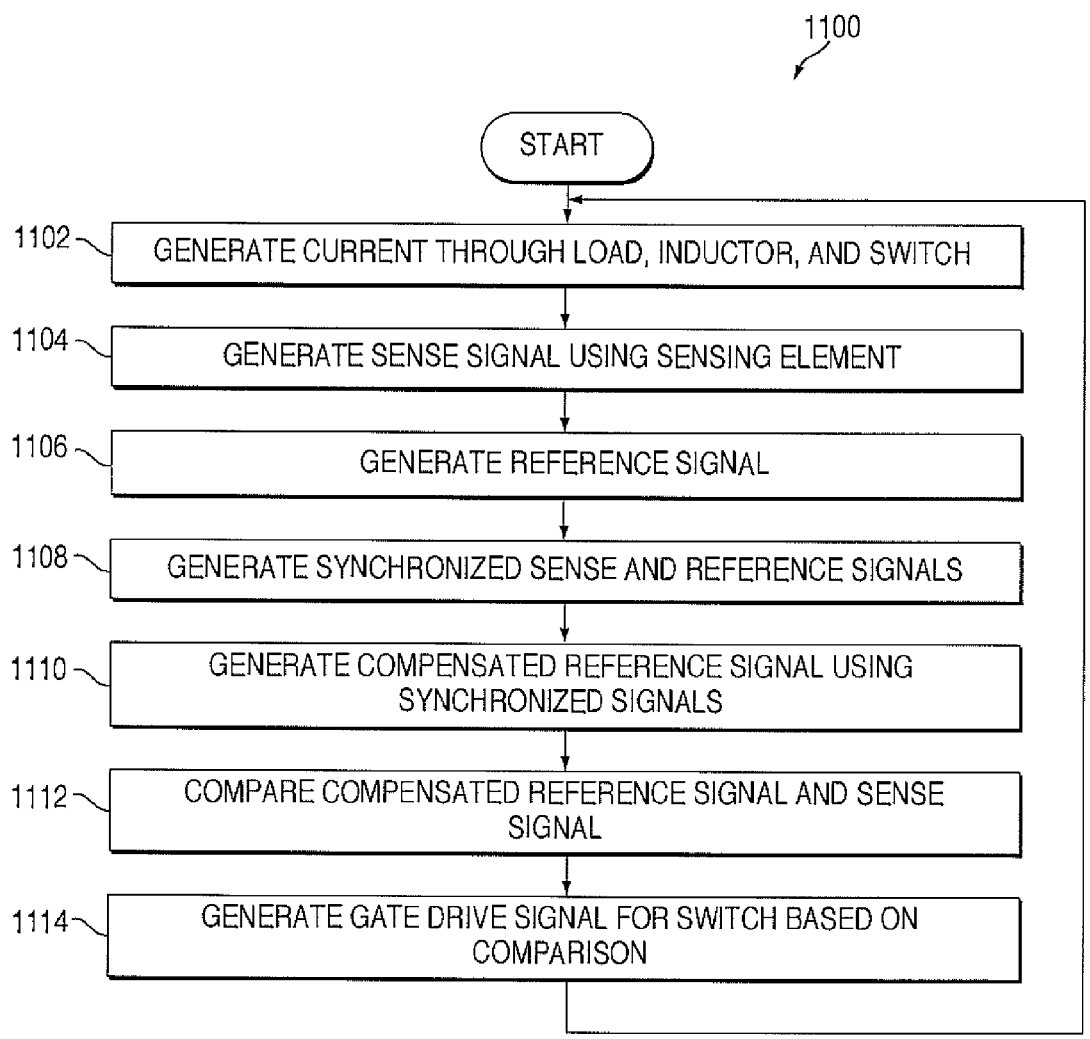
FIG. 11 illustrates an example method for balanced hysteretic control of a regulator according to this disclosure.

FIG. 11 illustrates an example method 1100 for balanced hysteretic control of a regulator according to this disclosure. For ease of explanation, the method 1100 is described with respect to the circuit 300 of FIG. 3. The method 1100 could be used by any suitable device or system.

As shown in FIG. 11, a current is generated through a load, an inductor, and a switch in a power stage at step 1102. This could include, for example, the circuit 300 causing the switch 318 to close, which creates a current through the LED string 310, the inductor 312, and the switch 318. A sense signal is generated using a sensing element at step 1104. This could include, for example, generating a sense voltage $V_{ISNS}$ using the sense element 304. The sense element 304 can be connected directly to the switch 318 but not the LED string 310 or other load.

A reference signal is generated at step 1106. This could include, for example, generating the reference voltage $V_{IREF}$. Synchronized sense and reference signals are generated at step 1108. This could include, for example, operating the switches 504-510 in the true average current control unit 306 to generate the reference pulse signal $V_{REFP}$ and the sense pulse signal $V_{ISNSP}$. The switches 504-510 can be controlled using the gate drive signal that controls the switch 318 in the power stage. The reference pulse signal $V_{REFP}$ and the sense pulse signal $V_{ISNSP}$ may or may not be filtered using RC circuits. A compensated reference signal is generated using the synchronized signals at step 1110. This could include, for example, the error amplifier 512 in the true average current control unit 306 amplifying a difference between the synchronized pulsed signals to generate the compensated reference voltage $V_{CTRL}$.

The compensated reference signal and the sense signal are compared at step 1112. This could include, for example, the comparator 322 comparing the compensated reference voltage $V_{CTRL}$ and the sense voltage $V_{ISNS}$. A gate drive signal for the switch in the power stage is generated based on the comparison at step 1114. This could include, for example, the hysteretic control unit 308 triggering the off timer 706 when the sense voltage $V_{ISNS}$ reaches (equals or exceeds) the compensated reference voltage $V_{CTRL}$, causing the gate drive signal to go low. This could also include, once the off timer 706 expires, the hysteretic control unit 308 triggering the on timer 704, causing the gate drive signal to go high. The gate drive signal may remain high until the on timer 704 expires or the sense voltage $V_{ISNS}$ reaches the compensated reference voltage $V_{CTRL}$ again (whichever is later).

In this way, the sensing element may generate the sense voltage only during the times when the switch in the power stage is conducting, which can reduce power losses. Moreover, the true average current control unit and the hysteretic control unit can operate to provide true average current control and fast response for the regulator.

Although FIG. 11 illustrates one example of a method 1100 for balanced hysteretic control of a regulator, various changes may be made to FIG. 11. For example, while shown as a series of steps, various steps in FIG. 11 could overlap, occur in parallel, occur in a different order, or occur multiple times.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for regulating current supplied to a load, comprising:
   a switching regulator, including a switching transistor, configured to regulate current through the load by controlling switching of the transistor;
   the switching regulator coupled to receive a sense signal based on a current through the transistor corresponding to the current through the load;
   a current control unit configured to generate a compensated reference signal using the sense signal, the compensated reference signal associated with an average of the current through the transistor;
   a comparator configured to provide an on-time control signal indicating when the sense signal reaches the compensated reference signal; and
   a switching control unit configured to adjust a switching control signal based on the on-time control signal and to provide the switching control signal to the transistor to control an on time period $T_{ON}$ during which the transistor is switched on, with the end of the TON period determined by the on-time control signal, thereby regulating current through the load.

2. The apparatus of claim 1, wherein:
   the sensing signal is generated by a sense element; and
   the sense element is coupled directly to the switching transistor and is not coupled directly to the load, such that a current through the sense element is substantially zero when the switch is not conducting.

3. The apparatus of claim 1, wherein the current control unit comprises:
   an error amplifier having a first input and a second input;
   first switches configured to generate a reference pulse signal based on a reference signal; and
   second switches configured to generate a sense pulse signal based on the sense signal;
   wherein the error amplifier is configured to generate the compensated reference signal based on the reference pulse signal and the sense pulse signal.

4. The apparatus of claim 1, wherein the load comprises multiple light emitting diodes.

5. The apparatus of claim 1, wherein the switching control unit comprises:

an off timer with an off time period $T_{OFF}$ during which the transistor is switched off by the switching control signal; and
a logic unit configured to receive the on time control signal from the comparator and to trigger the off timer to initiate a TOFF period at the end of the TON period.

6. The apparatus of claim 5, wherein the switching control unit is configured to:
   initiate a $T_{OFF}$ period by triggering the off timer when the on time control signal from the comparator indicates the end of the $T_{ON}$ period;
   initiate the $T_{ON}$ period when the off timer expires at the end of the $T_{OFF}$ period; and
   initiate a next $T_{OFF}$ period when the $T_{ON}$ period ends, such that the switching frequency of the switching transistor corresponds to $T_{ON}+T_{OFF}$.

7. The apparatus of claim 6, wherein the $T_{OFF}$ period is substantially constant.

8. The apparatus of claim 6, wherein the load is coupled to a source of input voltage $V_{IN}$, and wherein the $T_{OFF}$ period is not constant, and is adaptively controlled based on $V_{IN}$ and an output voltage across the load $V_O$ such that the switching frequency corresponding to TON+TOFF is substantially constant.

9. A method for controlling a switching regulator including a switching transistor to regulate current supplied to a load, comprising:
   generating a sense signal based on a current through the transistor corresponding to the current through the load;
   generating a compensated reference signal using the sense signal, the compensated reference signal associated with an average of the current through the transistor;
   comparing the compensated reference signal and the sense signal and providing an on-time control signal indicating when the sense signal reaches the compensated reference signal;
   adjusting a switching control signal based on the on-time control signal; and
   providing the switching control signal to the transistor to control an on time period $T_{ON}$ during which the transistor is switched on, with the end of the $T_{ON}$ period determined by the on-time control signal, thereby regulating current through the load.

10. The method of claim 9, wherein:
    generating the sense signal comprises using a sense element; and
    the sense element is coupled directly to the switching transistor and is not coupled directly to the load; such that a current through the sense element is substantially zero when the switch is not conducting.

11. The method of claim 9, wherein generating the compensated reference signal comprises:
    generating a reference pulse signal based on a reference signal;
    generating a sense pulse signal based on the sense signal; and
    generating the compensated reference signal based on the reference pulse signal and the sense pulse signal.

12. The method of claim 11, wherein the load comprises multiple light emitting diodes.

13. The method of claim 9, wherein adjusting the control signal comprises:
    initiating a $T_{OFF}$ period when the on time control signal indicates the end of the $T_{ON}$ period;
    initiating the $T_{ON}$ period at the end of the $T_{OFF}$ period; and initiating a next $T_{OFF}$ period when the $T_{ON}$ period ends, such that the switching frequency of the switching transistor corresponds to $T_{ON}+T_{OFF}$.

14. The method of claim 13, wherein the load is coupled to a source of input voltage $V_{IN}$, and wherein the $T_{OFF}$ period is not constant, and is adaptively controlled based on the $V_{IN}$ and an output voltage across the load $V_O$ such that the switching frequency corresponding to TON+TOFF is substantially constant.

15. A system comprising:
a load;
a switching regulator, including a switching transistor configured to regulate current through the load by controlling switching of the transistor; and
a control circuit comprising:
a sense element configured to generate a sense signal based on a current through the switching transistor corresponding to the current through the load;
a current control unit configured to generate a compensated reference signal using the sense signal, the compensated reference signal associated with an average of the current through the transistor;
a comparator configured to provide an on-time control signal indicating when the sense signal reaches the compensated reference signal; and
a switching control unit configured to adjust a switching control signal based on the on-time control signal and to provide the switching control signal to the transistor to control an on time period $T_{ON}$ during which the transistor is switched on, with the end of the TON period determined by the on-time control signal, thereby regulating current through the load.

16. The system of claim 15, wherein:
the sense element is coupled directly to the switching transistor and is not coupled directly to the load; such that a current through the sense element is substantially zero when the switch is not conducting.

17. The system of claim 16, wherein the load comprises multiple light emitting diodes.

18. The system of claim 15, wherein the current control unit comprises:
an error amplifier having a first input and a second input;
first switches configured to generate a reference pulse signal based on a reference signal; and
second switches configured to generate a sense pulse signal based on the sense signal;
wherein the error amplifier is configured to generate the compensated reference signal based on the reference pulse signal and the sense pulse signal.

19. The system of claim 15, wherein the switching control unit comprises:
an off timer with an off time period $T_{OFF}$ during which the transistor is switched off by the switching control signal; and
a logic unit configured to:
initiate a $T_{OFF}$ period by triggering the off timer when the on time control signal from the comparator indicates the end of the $T_{ON}$ period;
initiate the $T_{ON}$ period when the off timer expires at the end of the $T_{OFF}$ period; and
initiate a next $T_{OFF}$ period when the $T_{ON}$ period ends, such that the switching frequency of the switching transistor corresponds to $T_{ON}+T_{OFF}$.

20. The system of claim 19, wherein the load is coupled to a source of input voltage $V_{IN}$, and wherein the $T_{OFF}$ period is not constant, and is adaptively controlled based on the $V_{IN}$ and an output voltage across the load $V_O$ such that the switching frequency corresponding to TON+TOFF is substantially constant.

* * * * *